United States Patent Office 2,907,234
Patented Oct. 6, 1959

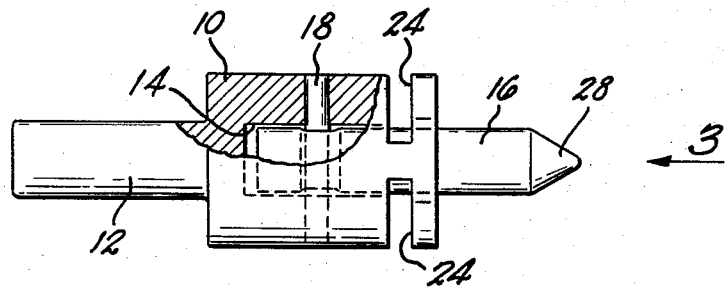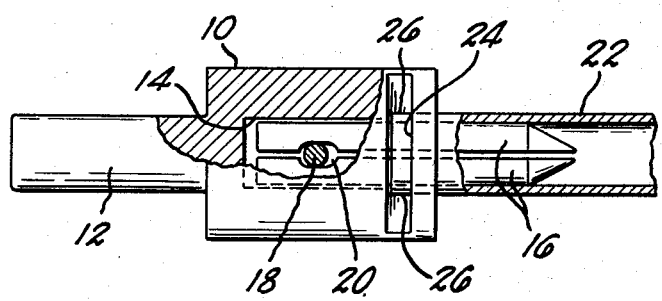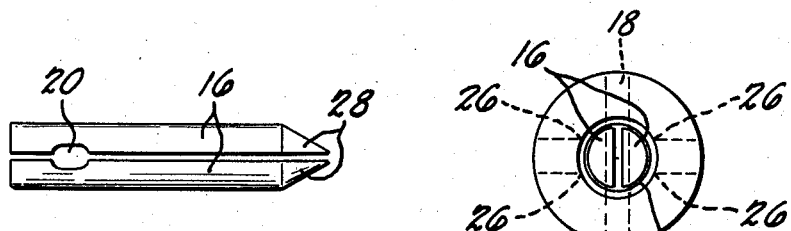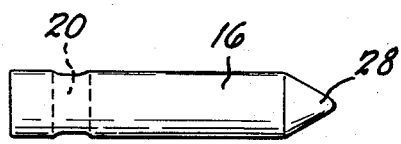
INVENTORS
RAYMOND H. WADE
ROBERT C. NISWONGER
THEIR ATTORNEY

2,907,234

BURRING TOOLS

Raymond H. Wade, Greenville, and Robert C. Niswonger, Ludlow Falls, Ohio

Application October 19, 1956, Serial No. 617,071

6 Claims. (Cl. 77—73)

This invention relates to burring tools and more particularly to a burring tool for use in removing burrs from the ends of tubing.

Prior to applicants' invention considerable difficulty was experienced with tubing used for refrigerant condensers and evaporator coils due to the inability of the conventional burring tools to remove burrs from tubing which was slightly out of round. The tubing used in manufacturing evaporators and condensers is generally very ductile, and consequently, the ends of the tubing are frequently distorted during handling in the factory to such an extent that a large percentage of the tubing has had to be scrapped in the past due to the inability of the conventional burring tools to true up the damaged ends of the tubing.

It is an object of this invention to provide a burring tool capable of simultaneously truing-up the flattened ends of tubing and removing the internal and external burrs at the end of the tubing. In addition to being more effective in truing-up out-of-round tubing, the burring tool according to this invention has the added advantage that it is very cheap to construct and trouble-free on the job.

Further objects and advantages of the present invention will be apparent from the following description, reference being had to the accompanying drawings, wherein a preferred form of the present invention is clearly shown.

In the drawings:

Figure 1 is a side elevational view, with parts broken away, of a burring tool constructed in accordance with the invention;

Figure 2 is a view similar to Fig. 1 but showing the tool rotated through an angle of 90° and showing a piece of tubing in the tool;

Figure 3 is an end view of the tool shown in Figs. 1 and 2;

Figure 4 is a side view of the internal burring elements; and

Figure 5 is a view similar to Fig. 4 but showing the elements rotated through an angle of 90°.

Referring now to the drawing wherein a preferred embodiment of the invention has been shown, reference numeral 10 designates the main housing or head of a burring tool which is provided with a shank 12 for use in mounting the burring tool in a chuck of a drill press or the like. The head 10 is provided with a central recess or bore 14 within which a pair of semi-round reaming blades or cutters 16 are loosely mounted. The blades 16 are held in place within the central recess 14 by means of a pin 18 which is carried by the head 10 and which passes through the cutaway portions 20 provided adjacent the inner ends of the element 16 as best shown in Fig. 4.

The internal diameter of the central bore 14 is sufficiently greater than the external diameter of the combined elements 16 so as to provide clearance therebetween for the reception of the end of a piece of tubing. Thus, as shown in Fig. 2, a portion of tubing 22 which is to have the burrs thereon removed may be inserted over the member 16 and into the central bore 14 of the cutting head 10. The head 10 is provided with saw-cuts 24 which are arranged as shown, whereby cutting edges 26 are formed for removing the burrs from the outer portion of the ends of the tubing.

It should be noted that the internal reaming elements 16 are loosely supported within the bore 14 and that they extend a considerable distance beyond the face of the cutting-head 10 so as to extend into the tubing a sufficient distance to true up the internal diameter of the tubing for the necessary distance. It should also be noted that the cutaway portions 20 permit a limited amount of axial movement of the element 16 relative to the supporting cutting head 10.

The cutting elements 16 are tapered at their ends as indicated at 28 so as to facilitate insertion of the tool into the ends of the tubing. By virtue of the structural arrangement of the device it is obvious that the elements 16 can be inserted into the ends of tubing which has been partially flattened and that the cutting or reaming elements 16 tend to move radially outwardly in response to centrifugal action so as to not only cause the tubing to become rounded but also to remove any burrs from the interior of the tubing. The device is less critical to variations in tubing size than other burring tools due to the ability of the reaming elements to spread apart and engage the inner walls of the largest as well as the smallest tubing encountered.

The elements 16 are made by cutting a round piece of bar stock down through the middle with the result that the edges formed in cutting the bar stock serve as the cutting edges which remove the internal burrs on the tubing. The burring tool shown in the drawing may be made very cheaply since the cutting edges are all formed by making simple saw-cuts. The tool can be used in conventional drill presses or any other type of machine used for operating burring tools.

While the form of embodiment of the invention as herein disclosed constitutes a preferred form, it is to be understood that other forms might be adopted, as may come within the scope of the claims which follow.

What is claimed is as follows:

1. A burring tool comprising a head adapted to be rotated about a given axis, means carried by said head for insertion into the end of a section of tubing, said means comprising a plurality of reamer elements, and means for pivotally supporting said reamer elements on said head whereby said reamer elements are free to be moved radially outwardly by centrifugal force in response to rotation of said head, said head having a central recess in which said reamer elements are mounted and into which the end of a tube may be inserted.

2. A burring tool for finishing the cut ends of tubes or pipes comprising a head provided with an axial recess in its face, said head having cutting surfaces around the outer margin of said recess for removing external burrs on tubes, and a reaming cutter arranged to project centrally from said recess for removing internal burrs on said tubing, said reaming cutter comprising segmental portions having outer ends projecting beyong the face of said head, each of said segmental portions being substantially semi-circular in cross section with their flat sides arranged in face to face relationship, said semi-circular portions having opposed elongated notches formed in their flat sides so as to form an elongated pin slot, and pin means carried by said head and passing through said pin slot so as to hold the ends of said semi-circular portions in the axial recess in said head.

3. A burring tool for finishing the cut ends of tubes or pipes comprising a head provided with an axial recess in its face, said head having cutting surfaces around the outer margin of said recess for removing external burrs on tubes, and a reaming cutter arranged to project centrally from said recess for removing internal burrs on said tubing, said reaming cutter comprising segmental portions having outer ends projecting beyond the face of said head, each of said segmental portions being substantially semi-circular in cross section with their flat sides arranged in face to face relationship, said semi-circular portions having opposed elongated notches formed in their flat sides so as to form an elongated pin slot, and pin means carried by said head and passing through said pin slot so as to hold the ends of said semi-circular portions in the axial recess in said head, the external diameter of said multiple section reaming cutter being less than the internal diameter of said axial recess whereby said sections are free to move radially outwardly in response to centrifugal force resulting from rotation of the burring tool.

4. A burring tool for finishing the cut ends of tubes or pipes comprising a head provided with an axial recess in its face, said head having cutting surfaces around the outer margin of said recess for removing external burrs on tubing, and a reaming cutter arranged to project centrally from said recess for removing internal burrs on the tubing, said reaming cutter comprising segmental portions projecting beyond the face of said head, and pin and slot means for loosely securing said segmental portions to said head so as to freely have independent limited radial movement relative to said head.

5. A burring tool comprising a head provided with a central axially extending recess in its one face, said head having slots in its outer periphery so as to form cutting surfaces adjacent the juncture of said slots and said annular recess, reaming means within said central recess, said reaming means comprising a pair of radially movable segments having a loose fit within said central recess, and means for holding said reaming means in said recess, said last named means comprising a pin carried by said head and passing through a slot in said reaming means whereby said segments are forced radially outwardly by centrifugal force in response to rotation of said head.

6. A burring tool comprising a head rotatable about a given axis and provided with a central axially extending recess in its one face, said head having portions of its outer periphery cut away so as to form cutting surfaces adjacent the margin of said annular recess, and reaming means supported within said central recesses for limited movement relative to said head, said reaming means comprising a plurality of semi-round segments and means for loosely mounting said segments for limited radial movement in response to rotation of said head.

References Cited in the file of this patent

UNITED STATES PATENTS

| | | |
|---|---|---|
| 1,758,521 | Kerrigan | May 13, 1930 |
| 1,903,576 | Skeel et al. | Apr. 11, 1933 |
| 2,613,558 | Swenson | Oct. 14, 1952 |

FOREIGN PATENTS

| | | |
|---|---|---|
| 561,734 | Great Britain | June 2, 1944 |